United States Patent [19]
Jonville et al.

[11] 3,907,594
[45] Sept. 23, 1975

[54] METHOD OF MANUFACTURING LEAD ELECTRODES FOR STORAGE CELLS

[75] Inventors: Pierre Jonville; Helmut Stöhr; Klaus D. Beccu, all of Geneva, Switzerland

[73] Assignee: Battelle Memorial Institute, Switzerland

[22] Filed: Feb. 12, 1974

[21] Appl. No.: 441,813

[30] Foreign Application Priority Data
Feb. 12, 1973 Switzerland .................. 1959/73

[52] U.S. Cl. .................. 136/27; 136/64; 136/76
[51] Int. Cl. .................. H01m 35/00
[58] Field of Search .................. 136/26–27, 136/66–67, 68, 74, 75–76, 19, 34, 64, 65; 117/140 R

[56] References Cited
UNITED STATES PATENTS

| | | | |
|---|---|---|---|
| 2,347,131 | 4/1944 | Seabury et al. | 423/620 |
| 3,084,207 | 4/1963 | Hughes et al. | 136/27 |
| 3,173,810 | 3/1965 | Voss et al. | 136/27 |
| 3,266,936 | 8/1966 | Krebs | 136/74 X |
| 3,351,445 | 11/1967 | Fielder et al. | 136/27 X |

*Primary Examiner*—Anthony Skapars
*Attorney, Agent, or Firm*—Robert E. Burns; Emmanuel J. Lobato; Bruce L. Adams

[57] ABSTRACT

A method of manufacturing electrodes for lead storage batteries by providing a felt of glass fibers and depositing thereon molten lead or lead alloy sprayed in a molten state to fill the space between the fibers of the felt to form an electrically conductive zone defining electrode contacts. A mass of powdered leadbased material is introduced into the felt by filtration for subsequently producing therefrom an active electrode mass by at least one electrochemical transformation thereof. The felt is then cut into individual electrodes.

11 Claims, No Drawings

METHOD OF MANUFACTURING LEAD ELECTRODES FOR STORAGE CELLS

BACKGROUND OF THE INVENTION

This invention relates generally to batteries and more particularly to lead batteries.

Lead storage batteries are of great interest, particularly due to their low investment cost per installed kwhr and their great reliability and ruggedness. The use of this well-known type of storage battery is, however, limited at the present time to a relatively restricted range of applications, due in particular to various drawbacks inherent in the structure of the present electrodes, as well as the processes necessary for their manufacture.

Although the theoretical specific energy of the cell $Pb/H_2SO_4/PbO_2$ amounts to 170 whr/kg, the value obtained in practice up to now with lead storage batteries is only about 30 whr/kg. The high specific weight of the present storage batteries of this type is due in large part to the fact that they comprise electrode supports in the form of molded grids, as well as to the fact that the coefficient of utilization of the active material is limited. These grids furthermore satisfy only to a limited extent the requirements with respect to resistance to corrosion on the one hand and to the maintaining of their electric contact with the active material during the cycling on the other hand.

Furthermore, the molding of these support grids scarcely lends itself to the continuous manufacture of the electrodes. In addition, the present methods of manufacture include a so-called pasting operation which consists in introducing a pasty mixture formed of lead, lead oxide, water and sulfuric acid into the support grids. This pasting operation as well as the subsequent chemical reactions, however, require precise control. Satisfactory pasting, as a matter of fact, is possible only if one avoids the prior setting of the material used for the pasting. Therefore, it is difficult to effect the manufacture continuously with good reproducibility.

Now, the present processes for the manufacture of electrodes for lead storage batteries are carried out batchwise since the casting of the grids on the one hand and the preparation of the reaction mixture, followed by the pasting, on the other hand are operations which are independent of each other. Another drawback of the present processes of manufacturing electrodes with cast support grids is that they do not permit the obtaining of very thin electrodes, of a thickness of less than about 1.5 mm. This constitutes a major obstacle with respect to the improvement in the utilization of the active material, as well as to an increase of the power per unit of weight of the present lead storage batteries.

SUMMARY OF THE INVENTION

The object of the present invention is to make possible the continuous manufacture of electrodes for lead storage batteries by obviating the aforementioned drawbacks of the present electrodes and processes.

For this purpose, the object of the invention is a process of manufacturing electrodes for lead storage batteries, which is characterized by depositing lead or a lead alloy on a strip or on plates in the form of a fiber glass felt in such a manner as to form conductive zones which at least partially cover the fibers of the felt, introducing by filtration into the felt a powdered material having a base of lead which is intended to provide the active material of the electrodes by at least one electrochemical transformation of said material, and cutting the strip or plates into electrodes of the desired shape and size.

DESCRIPTION OF THE PREFERRED EMBODIMENTS

The following examples serve to illustrate the carrying out of this process.

EXAMPLE 1

Positive electrodes comprising lead dioxide as active material are manufactured continuously in the following manner:

A(i). As starting material for the manufacture of the electrode supports there is used:

A continuous strip in the form of a felt composed of glass fibers assembled by means of a binder; this is a prefabricated product readily available on the market and having in the present case a width of 300 mm, a thickness of 1 mm, and a specific weight of 1.2 g/dm$^2$.

A(ii). In order to obtain conductive supports, glass fibers constituting the strip are first of all continuously metallized. For this there is used a lead-antimony alloy (5% Sb by weight) which is deposited by spraying the molten alloy in such a manner as to form a coating which uniformly covers all the fibers of the felt forming the strip. This metal-spraying is effected continuously by means of two flame spray devices between which the strip is continuously passed at constant speed.

The alloy is melted and sprayed by means of oxyacetylene torches onto both faces of the strip in such a manner as to form the said uniform coating which covers the glass fibers, an amount of alloy of about .15g/dm$^2$ being thus deposited.

In this way there is obtained a metallized strip having a uniform porosity which corresponds approximately to that of the initial felt and which is intended to form the electrode supports.

A(iii). In order to obtain subsequently the electrode contacts, a second flame-spraying is then effected with the same alloy (95 Pb-5 Sb) continuously over a central longitudinal zone of a width of 30 mm of the metallized strip as it moves continuously between two flame spray devices arranged opposite said central zone and downstream of the devices serving for the metal-spraying of the felt. This second spraying is effected in such a manner as to fill with alloy the space between the fibers of the metallized felt which are located in said region. The said central region is then subjected to compression by means of two rollers in order to eliminate open pores.

B(i). The strip which has thus been metallized and provided with a compact central region is then subjected to a continuous impregnation which serves to introduce into the pores of the metallized felt a powdered material intended to constitute the active material of the electrodes, after a transformation which is described further below. In the present case this material consists of a mixture of powdered PbO and Pb comprising 36% by weight of metallic lead.

B(ii). This impregnation is effected by forming a suspension of the said powdered material in deionized water and then subjecting this suspension to continuous filtration by suction through the moving metallized strip in such a manner that the particles of said material are retained and in part fill up the space between the metallized fibers of the strip. The amount of powdered mixture thus continuously introduced into the strip amounts to 42 g of powder per dm² of the strip.

C(i). After a passage of the strip through an ambient-air drying zone, the impregnated strip is then subjected to a treatment which serves to transform the PbO contained therein partially into PbSO₄. This treatment consists in introducing into the strip a given amount of sulfuric acid in dilute aqueous solution (density = 1.26), the quantity of dilute acid introduced being equal to 6 cc per dm² of the strip and the reaction time being a few minutes.

C(ii). The treated strip is then subjected to continuous drying in a stream of air at 50°C.

D. The dry strip is then cut so as to obtain electrode plates of the desired shape and size. As the strip in the present instance has a width of 30 cm, it is first of all cut transversely at distances of 110 mm apart and the plates thus obtained are then each cut into two electrode plates of 135 × 110 mm provided with a contact lug of 30 × 15 mm forming a longitudinal extension in one corner of the electrode plate, this lug coming from the said compact central region obtained in the manner described under A(iii) above.

E. The electrode plates are then stored in a conditioning tank in which they are exposed for 24 hours to air of 50°C and 50% relative humidity. The oxidation of the metallic lead contained in the plates and the formation of tribasic lead sulfate (PbSO₄, 3PbO) in the space between the metallized fibers forming the electrode support results from this.

F. The electrode plates are finally subjected to the so-called forming operation which is effected in accordance with the well known electrochemical transformation technique which is currently employed for the manufacture of electrodes for lead storage batteries.

This treatment consists in mounting a group of electrode plates electrically connected to each other in an electrolysis bath formed of dilute sulfuric acid in such a manner that said assembly forms a positive electrode, and passing an electric current through the bath in such a manner as to transform electrochemically the entire tribasic lead sulfate and the lead oxide into lead dioxide constituting the positive active material. The electrode plates which have undergone the forming are finally dried in order to permit their storage and are now ready to be used as positive electrodes in lead storage batteries with acid electrolyte.

EXAMPLE 2

Negative electrodes comprising sponge lead as active material are manufactured continuously in the following manner:

A(i). The starting material for the electrode supports is a continuous strip such as that described under A(i) of Example 1, except that the thickness of the strip is 0.8 mm and its specific weight 1 g/dm² in the present case.

This strip is heated before the metal-spraying by a stream of hot air in order to eliminate any moisture which might detrimentally affect the adherence of the metallic deposit subsequently.

A(ii). A continuous metallization is then effected in the manner described under A(i) in Example 1, except that the metallizing is effected with lead such as currently used in the manufacture of lead storage batteries, and that the depositing of the molten lead is effected by means of arcspray devices, the amount of lead deposited being 8 g/dm² in this case.

A(iii). In order subsequently to obtain the electrode contacts, a central longitudinal region of the strip, of a width of 30 mm, is filled with powdered lead which is introduced by dry suction into said zone, followed by a local heating which serves to melt the lead which has been introduced into said region and to obtain there a compact, composite lead/glass fiber structure which will provide the contacts.

B(i). The metallized strip provided with a central contact region is then subjected to impregnation with a material such as described under B(i) in Example 1.

B(ii). This impregnation, however, is carried out in this case by dry suction which makes it possible to retain in the space between the metallized fibers an amount of 35 g of powder mixture (64PbO/36Pb) per dm² of the strip, which is then wetted with an amount of deionized water just sufficient to hold the particles in place.

C, D, E, F. After the impregnated strip has been subjected, as in Example 1, to the acid treatment, followed by drying (Ci and ii) and cutting (D), the cut plates which have undergone the conditioning (E) are subjected to the forming operation described under (F) in Example 1, except that the assembly of plates is connected in such a manner as to form the negative electrode in the electrolysis tank, all the tribasic lead sulfate and the lead oxide being then transformed electrochemically into sponge lead which constitutes the negative active material.

The negative electrodes thus obtained are now ready for use in lead storage batteries with acid electrolyte. It is obvious that the same means can be employed to carry out various operations in the manufacture of the positive and negative electrodes, and that certain operations such as the forming may be carried out simultaneously in the two cases.

EXAMPLE 3

Positive electrodes comprising lead dioxide as active material are manufactured continuously in the following manner:

A(i). The starting material for the electrode supports is first of all manufactured by known techniques for the production of a felt of glass fibers assembled by means of a binder. This material has the shape of a continuous strip of felt composed of glass fibers, which strip in the present case has a width of 900 mm, a thickness of 1.2 mm, and a specific weight of 1.5 g/dm². The strip is heated by a stream of hot air in order to eliminate all moisture from it.

A(ii). A uniform, continuous metallization of the fibers of the felt strip is then effected in the manner described in Example 1 under A(ii), except that in this case 12 g/dm² of a lead-antimony alloy containing 3% Sb is deposited, the deposition being effected by electric arc spraying.

A(iii). In order to obtain the electrode contacts subsequently, the same lead alloy (with 3% Sb) is sprayed in molten state in three longitudinal regions the axes of which are located 150, 450 and 750 mm respectively from one or the other edge of the strip in such a manner that these three regions, each of a width of 30 mm, are entirely filled by the alloy.

B(i), (ii). An impregnation is then effected in the manner described in Example 1, except that the powdered material introduced by filtration is formed of a mixture of lead and lead alloy (with 3% Sb) used for the metal-spraying, the amount introduced being then 50 g of powder per dm² of the strip.

D. Once dry, the strip is cut transversely at distances apart of 110 mm, whereupon the plates which have thus been obtained are cut into six electrode plates having the same size as those of Example 1 (135 × 110 mm, contact lug 30 × 15 mm).

E. The electrode plates are then stored in a conditioning tank in the manner described in Example 1 so as to oxidize the metallic lead introduced by impregnation and transform it into PbO contained in the space between the metallized glass fibers.

F. Finally the so-called forming operation serving for the electrochemical transformation of the lead oxide into lead dioxide constituting the active material of the positive electrodes is carried out. This operation is also carried out in accordance with a known technique which consists in effecting a mounting of an assembly of positive electrode plates connected electrically between each other so as to form a positive assembly, passing this assembly through a bath of dilute sulfuric acid at the same time as a similar negative assembly comprising electrode plates intended to be formed into negative electrodes, and passing an electric current between the two assemblies so as to effect the forming.

The positive electrodes thus obtained are now ready for use, possibly after drying and storing, before mounting in the lead storage batteries.

EXAMPLE 4

Negative electrodes comprising sponge lead as active material are manufactured continuously in the following manner:

A(i). As starting material for the electrode supports there are used plates in the form of a felt composed of glass fibers assembled by a binder; this is also a product which is currently available on the market and has a width of 300 mm, a length of 1100 mm, a thickness of 0.6 mm, and a specific weight of 0.75 g/dm².

These plates are placed lengthwise alongside of each other so as to form a close row which is moved during the operations carried out subsequently on these plates.

A(iii). In order subsequently to obtain the electrode contacts, a central longitudinal region (width 30 mm) of the plates of the row is filled with powdered lead; this powder is introduced by dry suction in such a manner as to fill the space between the glass fibers with lead, followed by local heating which serves to melt the lead introduced into said region and to obtain therein after solidification a compact composite lead/glass fiber structure which will provide the contacts.

B(i). The plates which thus have a central longitudinal contact region are then subjected to continuous impregnation with a powdered material such as that used for the same purpose in Examples 1 and 2.

B(ii). However, in the present case the impregnation is effected by first of all uniformly depositing the powdered mixture (64PbO/36Pb) in dry state on the plates, followed by sprinkling with a sufficient amount of de-ionized water and aspiration of the paste formed within the felt in such a manner that the particles of this mixture are retained and partially fill the space between the glass fibers forming the plates of the row. 25 g of powder per dm² are thus introduced upon the impregnation of the plates.

C to E. The operations of treatment with sulfuric acid, followed by drying, cutting and conditioning, are then carried out on the plates of the row, substantially in the manner described in Examples 1 and 2 under C, D and E.

F. Finally, the so-called forming operation is carried out, this being done in the manner described in Example 2.

EXAMPLE 5

Negative electrodes comprising sponge lead as active material are manufactured continuously in the following manner:

A(i). The starting material for the electrode supports is first of all produced, this being done by the well known techniques for the production of composite felts of glass fibers assembled by means of a binder. In the present case this material has the shape of a continuous strip of felt of glass fibers of a width of 900 mm, a thickness of 1.0 mm, and a specific weight of 1.2 g/dm².

A(iii). Three longitudinal contact zones are then produced in the manner described in Example 3 under A(iii).

B and C. The impregnation and the acid treatment are then carried out as described under B and C respectively in Example 1.

D and E. The cutting of the strip and the conditioning are then effected in the manner described in Example 3.

I. Finally, the electrode bodies are subjected to the forming operation as described in Example 2 in order to obtain the negative electrodes ready for use.

In order to obtain positive electrodes, one can also contemplate a variant of Example 5 in which the conditioned plates obtained after E are subjected to two so-called forming operations. The first consists in mounting an assembly of electrode plates electrically connected to each other in an electrolysis bath formed of dilute sulfuric acid (density = 1.26) in such a manner that this assembly has a negative polarity, and passing an electric current through the bath so as electrochemically to transform the tribasic lead sulfate and the lead oxide in whole or in part into metallic lead. The forming current and voltage are selected in such a manner that a part of the metallic lead is as non-spongy as possible.

Upon the second forming operation, the sulfuric acid of density 1.26 is replaced by a sulfuric acid of a density of 1.06 and the forming is continued by reversing the current. In this way the metallic lead is partially converted into lead sulfate and then into lead dioxide which constitutes the active material of the positive electrode, while the other portion of the lead which has not undergone this second forming serves to assure the desired electric conductivity for the electrode. The electrode plates which have undergone the forming are finally dried in order to permit their storage and are now ready for use as positive electrodes in lead storage batteries with acid electrolyte.

As appears from the above examples, the present invention permits the manufacture of very thin electrodes, of a thickness of 0.6 to 1.2 mm, provided with a strong, light fibrous support and formed to the major part of the respective active material. These advantages are obtained, however, in accordance with the invention, by a process of manufacture which comprises only simple operations which are easy to control and which thus permit continuous manufacture with the use of well known techniques and apparatus which lend themselves particularly well to automatic manufacture in very large numbers. The invention also makes it possible to assure in all cases good conductivity of the electrode support and to do so in a particularly simple manner. As a matter of fact, the forming of a conductive support by the spraying of molten lead as described in Examples 1 and 2 is based on conventional techniques which lend themselves well to continuous production in large numbers. As appears furthermore from Examples 4 and 5, the prior metallizing of the fibers is not indispensable in all cases. As a matter of fact, it is possible to assure sufficient conductivity for the electrode without having to form a covering of lead by spraying, this constituting an additional simplification of the process of manufacture.

We claim:

1. Process of manufacturing electrodes for lead storage batteries, comprising the steps of:
    a. providing a felt of glass fibers in the form of a strip or sheet;
    b. preparing an electrode support structure from said felt of glass fibers in the form of a strip or sheet by depositing thereon lead or a lead alloy so as to at least partially cover the fibers of the felt and thereby provide conductive zones on said support;
    c. introducing into the felt support by filtration a mass of powdered lead-based material capable of subsequently producing an active electrode mass by at least one electrochemical transformation thereof; and
    d. cutting the felt into individual electrode bodies of desired shape and size.

2. Process according to claim 1, wherein the lead or lead alloy is deposited by spraying in the molten state to produce an electrically conductive coating uniformly covering all the glass fibers of the felt.

3. Process according to claim 2, wherein molten lead or lead alloy is sprayed in the molten state so as to fill the space between the fibers of the felt and thereby form at least one compact electrically conductive zone defining electrode contacts.

4. Process of claim 1, wherein said powdered material introduced into the felt to subsequently produce the active electrode mass consists mainly of lead oxide powder.

5. Process of claim 4, wherein said mass of powdered material is introduced by filtering a suspension thereof in a fluid through said felt.

6. Process of claim 4, further comprising the step of contacting said mass of powdered material after introduction thereof into the felt with a given amount of sulphuric acid to produce lead sulphate by reaction of said lead oxide powder in the mass with said acid.

7. Process according to claim 1, wherein said mass of powdered material introduced into said felt to subsequently provide the active electrode mass consists at least partially of lead in the metallic state.

8. Process according to claim 7, further comprising the step of treating the electrode bodies in moist air to produce lead oxide from the metallic lead therein.

9. Process according to claim 8, further comprising the step of subjecting the electrode bodies to an electrochemical forming treatment to produce a positive active electrode mass consisting of lead dioxide.

10. Process according to claim 8, further comprising the step of subjecting the electrode bodies to an electrochemical forming treatment to produce a negative active electrode mass consisting of metallic sponge lead.

11. Process according to claim 8, further comprising the step of subjecting the electrode bodies to a first electrochemical forming treatment to produce metallic sponge lead, and thereafter to a second electrochemical forming treatment to successively produce lead sulphate and then lead dioxide from one portion of said sponge lead, thereby to produce a positive active electrode mass from said one portion.

* * * * *